United States Patent [19]

Inanobe et al.

[11] Patent Number: 4,947,198
[45] Date of Patent: Aug. 7, 1990

[54] FINDER OPTICAL SYSTEM FOR SINGLE REFLEX CAMERAS

[75] Inventors: Tsutomu Inanobe; Hirofumi Tsuchida, both of Hachiouji, Japan

[73] Assignee: Olympus Optical Co., Ltd., Tokyo, Japan

[21] Appl. No.: 299,160

[22] Filed: Jan. 19, 1989

[30] Foreign Application Priority Data

Jan. 20, 1988 [JP] Japan ................................ 63-8280

[51] Int. Cl.$^5$ ............................................. G03B 13/08
[52] U.S. Cl. ................................................... 354/225
[58] Field of Search ............... 354/155, 166, 199, 200, 354/201, 219, 220, 221, 222, 223, 224, 225; 352/171

[56] References Cited

U.S. PATENT DOCUMENTS 4,119,985 10/1978 Ando et al. ...................... 354/155 X
4,707,103 11/1987 Ikemori et al. ................... 354/201 X

FOREIGN PATENT DOCUMENTS 56-40531 4/1981 Japan .
17415 1/1985 Japan ................................... 354/166
61-29816 2/1986 Japan .

OTHER PUBLICATIONS

Japanese Patent Preliminary Publication No. Sho 61-29816 and Japanese Utility Model Preliminary Publications No. Sho 56-40531, filed 1/19/89-an additional copy of Jap. Publ. '816.

Primary Examiner—Brian W. Brown
Attorney, Agent, or Firm—Cushman, Darby & Cushman

[57] ABSTRACT

A finder optical system for single reflex cameras is provided with a photographing lens, an optical path splitting device splitting a beam of light emanating from the photographing lens into two beams and directing one beam to a photographing system and directing the other to an observing system, and an electronic image pickup device disposed in the photographing system and having an image pickup surface for receiving an image formed by the light beam and a Porro prism for forming an orthographic image, and an eyepiece disposed in the observing system. Thus, the finder optical system for single reflex cameras can be provided which is simple in structure, small in size, and has a low manufacturing cost.

14 Claims, 6 Drawing Sheets

FINDER OPTICAL SYSTEM FOR SINGLE REFLEX CAMERAS

BACKGROUND OF THE INVENTION (a) Field of the Invention:

The present invention relates to a finder optical system for single reflex cameras, and more particularly to a finder optical system suitable for electronic still cameras and video cameras of a single reflex type.

(b) Description of the Prior Art:

Most of the finder optical systems for conventional single reflex cameras using emulsion coated films as shown in FIG. 1, split a beam of light emanating from a photographing lens 1 time-dividedly using a beam splitting mirror 2 termed a quick return mirror the split beams of light are directed into a photographing system and an observing system, in which the light beam traveling to the photographing system is imaged on a film 6, while the light beam to the observing system is imaged on a screen mat and its image is established as an orthographic image by a pentagonal roof prism 4 for observance through an eyepiece 5.

In the electronic still cameras and video cameras, however, an image pickup element as small as ⅔-inch size (6.6 mm×8.8 mm) or ½-inch size (4.8 mm×6.4 mm) is employed lease are extremely small as compared with the size (24 mm×36 mm) of the emulsion coated film for a 35 mm camera, so that when the image is observed through a finder of the camera having an eyepiece with the same magnification as in the conventional 35 mm camera (with the emulsion coated film) the eyepiece cannot bring about the size of the image sufficient for observation. Therefore, in the electronic still cameras and video cameras, it is necessary to reduce the focal length and increase the magnification of the eyepiece.

However, in the case where the optical system depicted in FIG. 1 is regarded as a basic arrangement and an electronic image pickup device such as an image pickup tube or a solid-state image sensor is used instead of the film, various problems have been encountered such as, as shown in FIG. 2, the eyepiece 5 cannot be disposed directly behind the pentagonal roof prism 4 due to space occupied by an electronic image pickup device 8, an optical filter 7, and an electrical circuit 9 which are disposed in the front and rear of the image pickup device 8. Therefore, the optical path length between the screen mat 3 and the eyepiece 5 must be unnecessarily extended and this makes it difficult to reduce the focal length of the eyepiece 5 for increasing of the magnification.

In the past, with the intention of solving these problems, Japanese Patent Preliminary Publication No. Sho 61-29816 has been proposed, in which the magnification of the eyepiece is raised to prevent the optical path length from the focal plane to the eyepiece from being extended when the lens length of the eyepiece is increased. Further, Japanese Utility Model Preliminary Publication No. Sho 56-40531 has been proposed to provide a single reflex type camera which has a small image pickup surface on the film disk and renders a greater magnification of the eyepiece.

The above-mentioned Sho 61-29816, however, has raised difficulties because the eyepiece increases in size and the entire optical system becomes bulky due to the complicated lens configuration.

In addition, the above-mentioned Sho 56-40531, which makes use of a roof prism as a prism for observing the orthographic image, has met with a problem when the magnification of the eyepiece is increased, wherein the roof prism needs to be ground with high accuracy so that resolution is not diminished. This results in a high cost. Further, since the eyepiece needs to be placed to the rear of the film disk due to the mechanical construction of the system, the use of the roof prism (whose distance between the entrance position and the exit position of the light beam is long) renders the optical system larger and does not meet the intention of reducing the thickness of a camera body.

SUMMARY OF THE INVENTION

In view of the above problems, it is an object of the present invention to provide a finder optical system for single reflex cameras which is simple in structure, small in size and has a low manufacturing cost.

In keeping with the above object and with others which will become apparent, a finder optical system for a single reflex camera is provided which is especially suitable for an electronic camera due to the compact structure, the finder optical system being provided with a photographing lens, optical path splitting means arranged behind the photographing lens for splitting a beam of light emanating from said photographing lens in one way of time division and light-amount division into a transmitted beam of light and a reflected beam of light which are conducted to an observing system and a photographing system, respectively, a photographing system for receiving the reflected beam of light from said optical path splitting means, and an observing system for transmitting the transmitted beam of light emanating from said optical path splitting means, said observing system including a Porro prism having four reflecting surfaces including a first reflecting surface through a fourth reflecting surface, and said observing system including an eyepiece for transmitting light emanating from said Porro prism. Arranging the photographing system at the side of the observing system to makes it possible to dispose the eyepiece just behind the Porro prism, and utilizing the advantage that the front-to-rear distance of the Porro prism is considerably diminished in comparison with the roof prism with the same optical path length.

According to a preferred formation of the present invention, the optical path splitting device is a quick return mirror so that the light beam traversing the photographing lens is transmitted to the observing system, and reflected to the photographing system. The optical path splitting device may also be constructed as a prism having a semi-transmissive reflecting surface and configured so that after a part of the light beam traversing the photographing lens is reflected from the semi-transmissive reflecting surface, it is further reflected from another surface and introduced onto an image pickup surface. This way the optical path can be split.

According to another preferred formation of the present invention, the Porro prism is partially configured by a metal mirror or a surface with a refractory lens function, hence the orthographic image can be attained with ease.

According to still another preferred formation of the present invention, an imaging surface optically equivalent to an image pickup surface disposed in the photographing system is provided on the optical path within the Porro prism. This way the optical path length between the imaging surface and the eyepiece can be further diminished.

This and other objects as well as the features and advantages of the present invention will become apparent from the following detailed description of the preferred embodiments when taken in conjunction with the accompanying drawings.

DETAILED OF THE PREFERRED EMBODIMENTS

Figure 1:
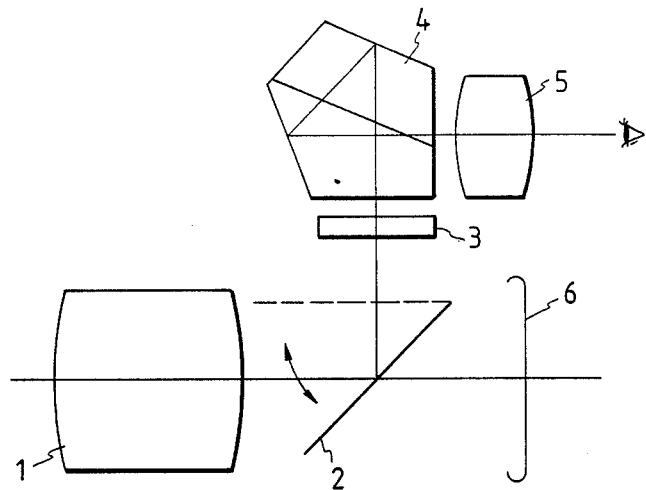
FIGS. 1 and 2 are views showing two prior art examples of a finder optical system for single reflex cameras.
Figure 2:
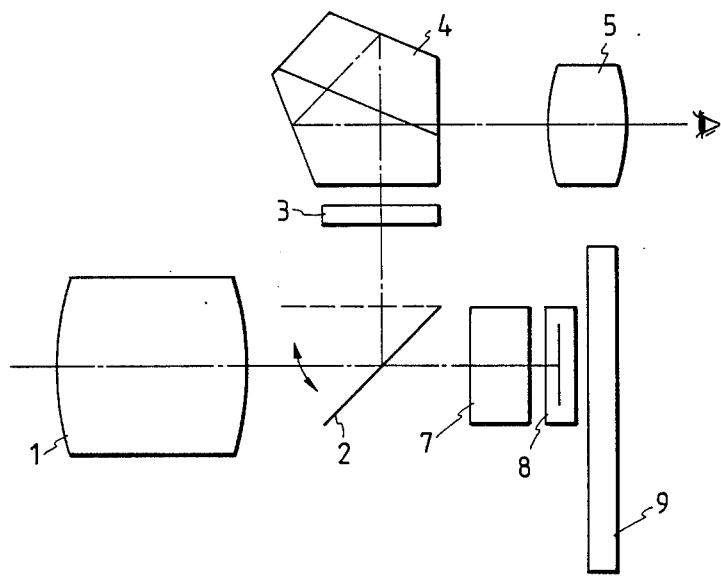

In accordance with the embodiments shown in the drawings, the present invention will be described in detail below.

Figure 3A:
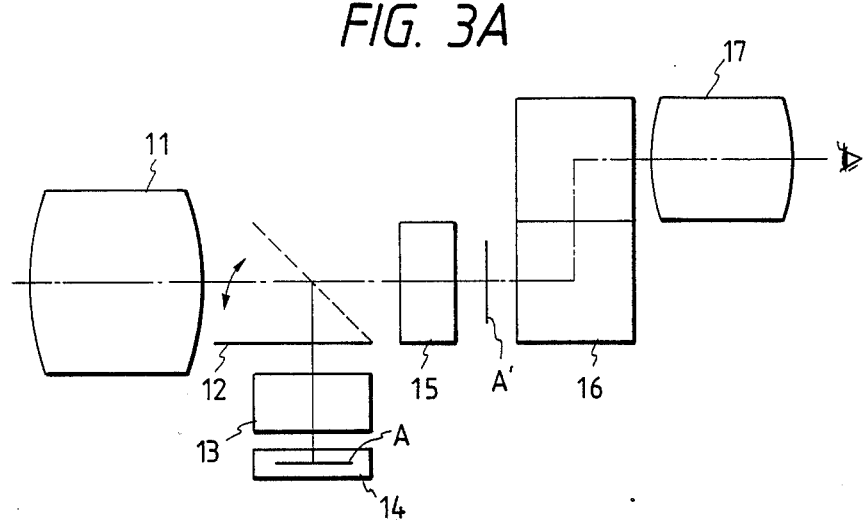
FIGS. 3A and 3B are a side view and a plan view, respectively, of a first embodiment of a finder optical system for single reflex cameras according to the present invention.
Figure 3B:
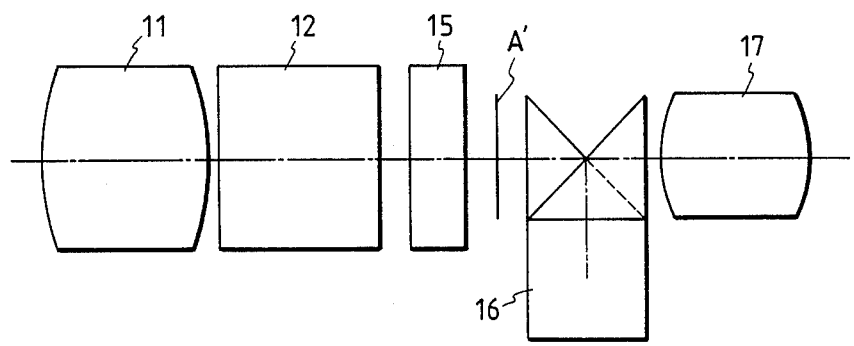
Figure 4A:
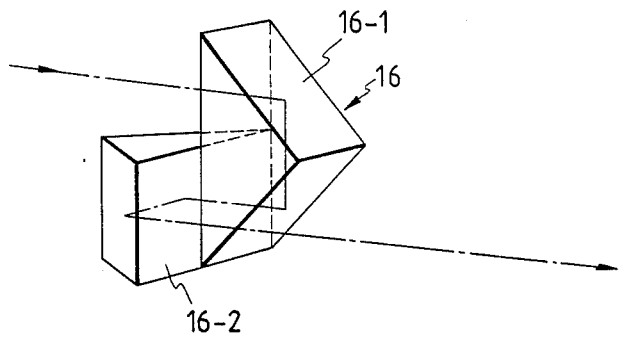
FIGS. 4A to 4D are perspective views showing the configurations of various Porro prisms used in the present invention.
Figure 4B:
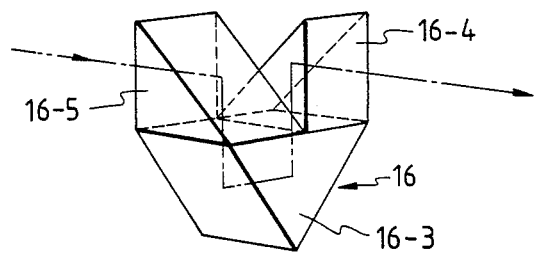
Figure 4C:
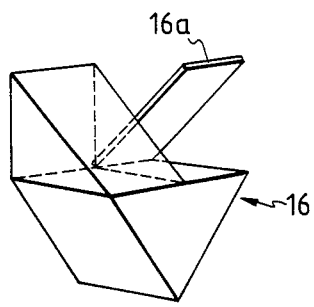

FIGS. 3A and 3B are a side view and a plan view of a first embodiment, respectively, in which reference numeral 11 represents a photographing lens and 12 a quick return mirror for time-dividedly splitting a beam of light traversing the photographing lens. The beam of light transmitted by mirror 12 is conducted to an observing system, while the beam of light reflected from mirror 12 is conducted to a photographing system. The conduction paths are indicated by dotted lines. Reference numerals 13 and 14 represent an optical filter such as an optical low-pass filter and an electronic image pickup device, respectively, which are arranged in order in the photographing system. The light beam reflected from the quick return mirror is imaged onto an image pickup surface A of the electronic image pickup device 14 via the photographing lens 11. Reference numerals, 16 and 17 represent an optical block such as a glass block, a Porro prism, and an eyepiece, respectively, which are arranged in order in the observing system which the light beam passing without being reflected from the quick return mirror 12 is imaged by the behavior an imaging surface A' optically equivalent to the image pickup surface A is disposed between the optical block 15 and the Porro prism 16 and, in this position, a field stop and a focusing screen can be a light beam transmitted by mirror 12 is imaged on imaging surface A'. The optical block 15 is arranged to render the imaging performance of the observing system equal to that of the photographing system, and its refractive index and thickness are determined in accordance with those of the optical filter 13 disposed in the photographing system. The Porro prism is shown in FIGS. 4A and 4B, in which the prism configuration of FIG. 4A consists of two triangle prisms 16-1, 16-2 and that of FIG. 4B consists of three triangle prisms 16-3, 16-4, 16-5 which are referred to as a first type Porro prism and a second type Porro prism, respectively. In place of a triangle prism there may be an equivalent optical element, for example, a metal mirror 16a as depicted in FIG. 4C or a surface with a lens function as indicated with reference numeral 16b of FIG. 4D.

Since the first embodiment is constructed as mentioned above, when the quick return mirror 12 is in a the position indicated by a dotted line, the light beam passing through the photographing lens 11 is reflected from the quick return mirror 12 and, after traversing the optical filter 13, is imaged on the image pickup surface A of the electronic image pickup device 14. In this instance, the image becomes a mirror image of that formed by the photographing lens 11, therefore the image is converted to an ordinary image for display on the screen of a TV monitor and the like by an electrical circuit not shown. Also, when the quick return mirror 12 is in a position indicated with a solid line, the light beam traversing the photographing lens 11 is transmitted from the quick return mirror 12 and, after passing through the optical block 15, is imaged on the imaging surface A' to be observed as an orthographic image through the Porro prism 16 and the eyepiece 17.

Figure 4D:
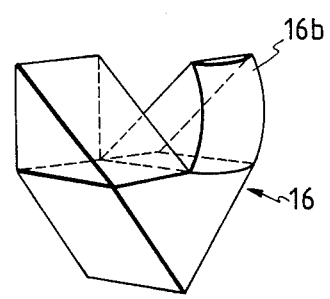

The function of the first embodiment has been described and as a result the photographing system can be arranged at the side of the observing system, so that it is possible to arrange the eyepiece 17 just behind the Porro prism 16. Even though the magnification of the eyepiece 17 is increased, the eyepiece 17 can be made simple in structure and small in size. Also, since the Porro prism 16 is smaller in front-to-rear distance as compared with a roof prism with the same optical path length, the overall length of the optical system can be reduced, together with the compaction of the eyepiece 17 mentioned above, with the result that the thickness of a camera body can also be reduced. Further, in virtue of the simplification of the compaction of the structure, the manufacturing cost of the optical system is cut. In addition, when the Porro prism 16 with the configuration shown in FIG. 4C or FIG. 4D is adopted, further reduction of cost or decrease in the number of parts can be realized.

Figure 5A:
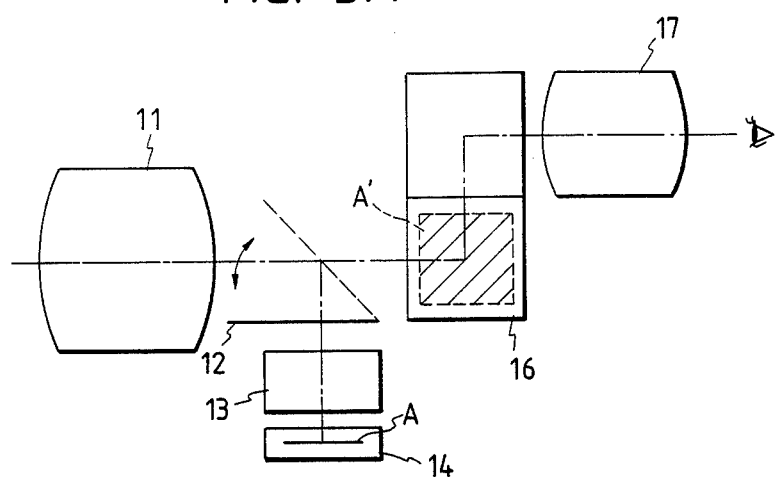
FIGS. 5A and 5B are a side view and a plan view, respectively, of a second embodiment of the present; and invention
Figure 5B:
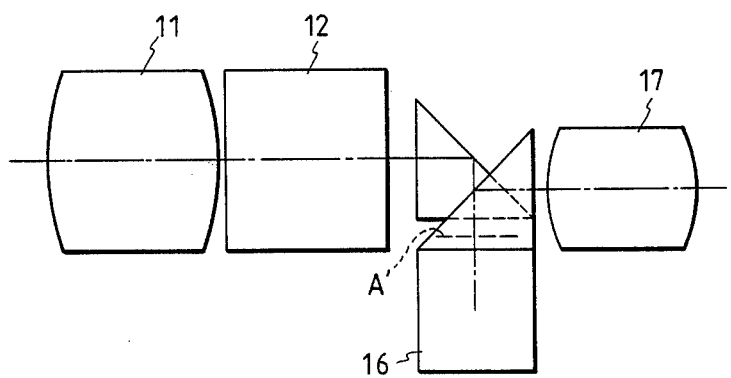

FIGS. 5A and 5B show a side view and a plan view of a second embodiment, respectively. This embodiment makes use of the type of Porro prism 16 shown in FIG. 4B. The Porro prism is constructed so that a little space is provided between the triangle prism 16-3 and the triangle prism 16-4 and an imaging surface A' which is optically equivalent to the image pickup surface A is positioned in the space. This second embodiment in which the imaging surface A' is placed in an optical path within the Porro prism 16, the optical path length between the imaging surface A' and the eyepiece 17 can be further diminished in comparison to the first embodiment and the eyepiece 17 can be configured more simply and smaller. Moreover, the Porro prism 16 can take on the function of the optical block 15 in the first embodiment and the block 15 can be omitted from the optical system, so that further size and cost reduction of the optical sytem are achieved.

Also, in the first and second embodiments, a mirror with a fixed semi-transmissive reflecting surface or a prism with the same may well be used instead of the quick return mirror 12.

FIGS. 6A, 6B, 6C and 6D show a side view, a plan view, a front view of the vicinity of the Porro prism 16 viewed from the photographing lens 11 side, and a perspective view of the overall system, respectively, of a third embodiment, which is the optical system employing a prism member 18 provided with a semi-transmissive reflecting surface 18a used as the optical path splitting means in place of the quick return mirror 12. The optical system is constructed so that a part of the light beam traversing the photographing lens 11 and incident on the prism member 18 is reflected from the semi-transmissive reflecting surface 18a, is further totally reflected from the object side surface 18b of the prism member 18. The reflected light beam emanates then from the prism member 18, passes through the optical filter 13, and is imaged on the image pickup surface A of the electronic image pickup device 14. Since the prism member 18 twice reflects the light beam traversing the photographing lens 11 before the light beam is imaged on the image pickup surface A, an image appears on image pickup surface A which is the same in vertical and horizontal directions as in the case where the light beam is directly imaged only by the photographing lens 11, consequently the ordinary electronic image pickup device 14 can be used without any change image correcting electrical circuit.

On the other hand, the light beam transmitted through the semi-transmissive reflecting surface 18a of the prism member 18 is observed as the orthographic image after traversing the Porro prism 16 and the eyepiece 17. Also, in the third embodiment, the optical system is constructed so that the imaging surface A' is positioned in the optical path within the Porro prism 16 as in second embodiment.

Figure 6A:
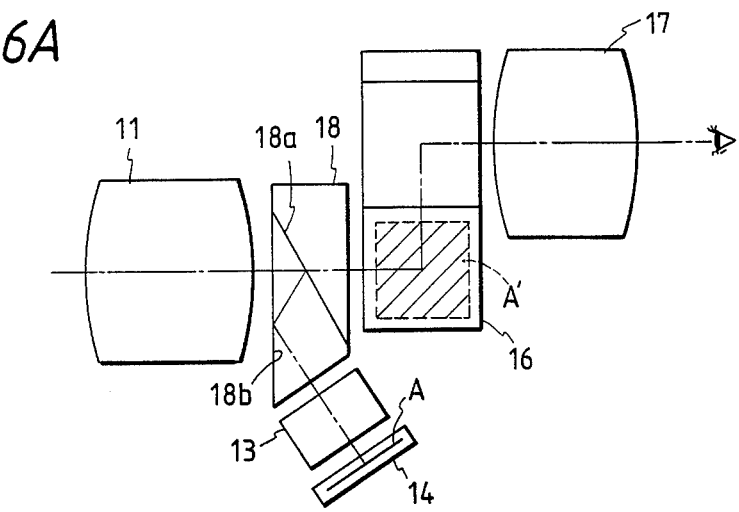
FIGS. 6A, 6B, 6C and 6D are a side view, a plan view, a front view of the vicinity of the Porro prism viewed from the photographing lens side, and a perspective view of the overall system, respectively, of a third embodiment.
Figure 6B:
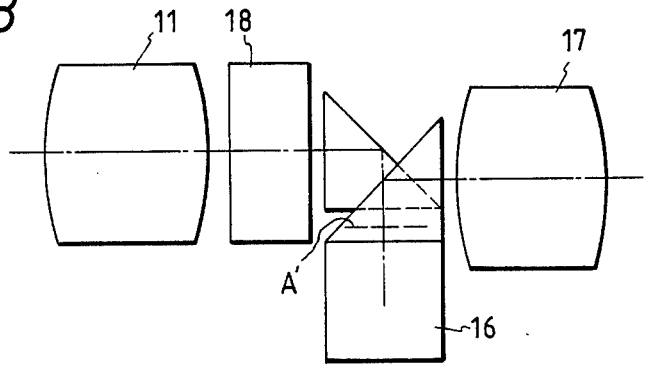
Figure 6C:
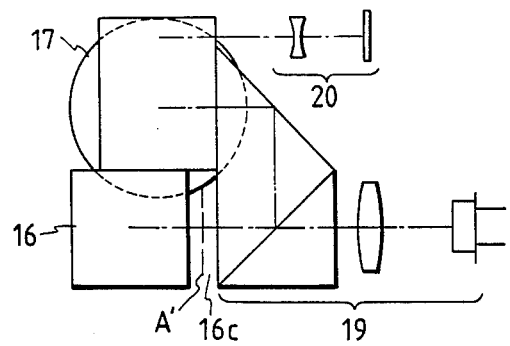
Figure 6D:
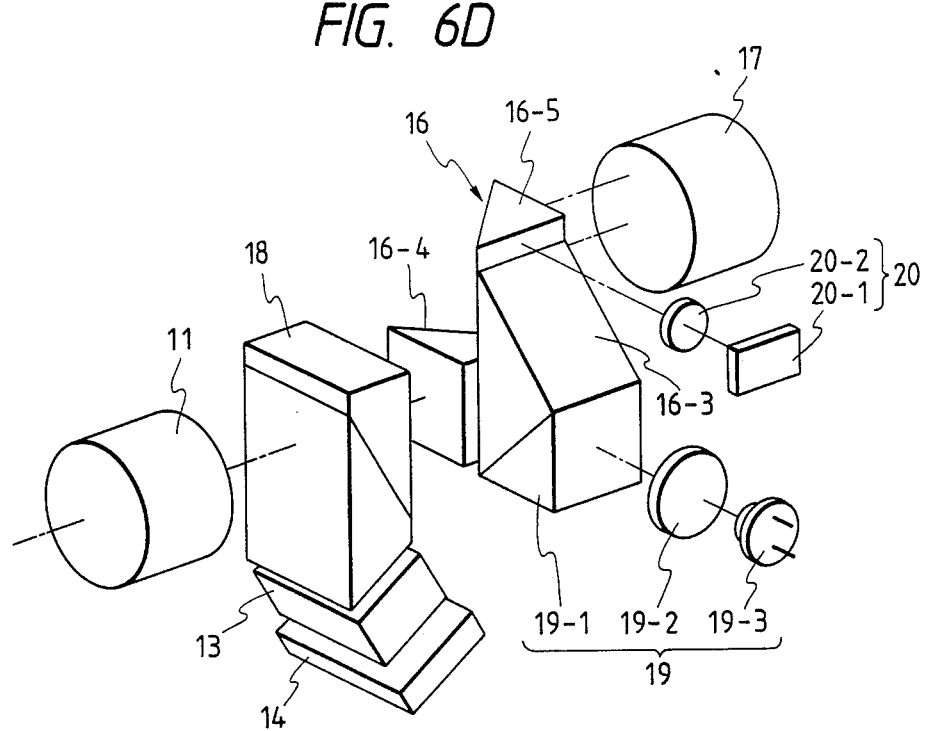

Further, as depicted in FIGS. 6C and 6D, the third embodiment can form an area of the surfaces of the prism 16-3 of the Porro prism 16 as a semi-transmissive reflecting surface and cement another prism 19-1 thereon. The additional prism 19-1 conducts a transmitted light beam to an optical system for photometry 19 which performs the photometry after receiving the light beam transmitted by the semi-transmissive reflecting surface of light receiving element 19-3 and conducted through lens 19-2. In addition, the third embodiment can also be provided with an optical system for indication purposes 20 operating from the light beam coming from a light emitting element for indication 20-1 incident through a lens 20-2 and a part of the surfaces of the Porro prism 16-5 toward the eyepiece 17. Further, if the imaging surface A' is positioned in a space 16c provided within the Porro prism 16, the arrangement of the field stop and the screen mat will be facilitated.

What is claimed is:

1. A finder optical system for single reflex cameras, comprising:
   a photographing lens;
   optical path splitting means for splitting a beam of light emanating from said photographing lens into a transmitted beam of light and a reflected beam of light, by one of time division and light-amount division, for conduction to an observing system and a photographing system, respectively;
   a photographing system for receiving the reflected beam of light from said optical path splitting means; and
   an observing system for transmitting the transmitted beam of light emanating from said optical path splitting means, said observing system including a Porro prism having four reflecting surfaces including a first reflecting surface through a fourth reflecting surface, and said observing system including an eyepiece for transmitting light emanating from said Porro prism.

2. A finder optical system according to claim 1, further including an imaging surface optically equivalent to an image pickup surface disposed within said Porro prism along an optical path between the first reflecting surface and the fourth reflecting surface.

3. A finder optical system for single reflex cameras, comprising:
   a photographing lens;
   optical path splitting means disposed along an optical path behind said photographing lens for splitting a beam of light emanating from said photographing lens into a transmitted beam of light and a reflected beam of light by one way of time division and light-amount division;
   a photographing system for receiving the reflected beam of light from said optical path splitting means; and
   an observing system for transmitting the transmitted beam of light from said optical path splitting means, said observing system including a Porro prism having four reflecting surfaces including a first reflecting surface through a fourth reflecting surface, and said observing system including an eyepiece for transmitting light emanating from said Porro prism.

4. A finder optical system according to claim 3, further including an imaging surface optically equivalent to an image pickup surface disposed within said Porro prism along an optical path between the first reflecting surface and the fourth reflecting surface.

5. A finder optical system according to any one of claims 1, 2, 3 or 4, wherein said Porro prism is adapted to impart an imaging performance on said observing system equivalent to that of said photographing system.

6. A finder optical system according to any one of claims 1, 2, 3 or 4, wherein said optical path splitting means is a quick return mirror.

7. A finder optical system according to any one of claims 1, 2, 3 or 4, wherein said optical path splitting means comprises a prism member having a semi-transmissive reflecting surface and at least one other reflecting surface wherein the light beam traverses said photographing lens and is split by the semi-transmissive reflecting surface into said transmitted and reflected beams of light, the reflected beam being further reflected from said at least one other reflecting surface of said prism member and introduced onto an image pickup surface.

8. A finder optical system according to any one of claims 1, 2, 3 or 4, wherein said observing system further includes an optical block disposed between said photographing lens and said imaging surface and having a predetermined refractive index and thickness for rendering imaging performance of said observing system equivalent to that of said photographing system.

9. A finder optical system according to claim 1, 2, 3 or 4, wherein said Porro prism further comprises a wedge prism and a triangle prism cemented to each other so that an entrance optical axis is parallel to an exit optical axis.

10. A finder optical system according to claim 1, 2, 3 or 4, wherein said Porro prism further comprises three triangle prisms cemented to each other so that an entrance optical axis is parallel to an exit optical axis.

11. A finder optical system according to claim 10, wherein said Porro prism further includes a light beam exit surface having a refractory lens function.

12. A finder optical system according to claim 1, 2, 3 or 4, wherein said Porro prism comprises two triangle prisms cemented to each other so that an entrance optical axis is parallel to an exit optical axis and a metal mirror.

13. A finder optical system according to claim 1, 2, 3 or 4, further including an optical system disposed on one of said reflecting surfaces of said Porro prism for an indication purpose on which a light beam conducted through said surface of said Porro prism falls incident.

14. A finder optical system according to claim 1, 2, 3 or 4, wherein one surface of said Porro prism is comprises a semi-transmissive reflecting surface, the finder optical system further including an optical system for photometry on which a light beam transmitted from said semi-transmissive reflecting surface falls incident.

* * * * *